(12) United States Patent
Oogaki

(10) Patent No.: US 9,018,114 B2
(45) Date of Patent: Apr. 28, 2015

(54) OPTICAL GLASS

(75) Inventor: Akio Oogaki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/342,273

(22) PCT Filed: Jul. 10, 2012

(86) PCT No.: PCT/JP2012/067546
§ 371 (c)(1),
(2), (4) Date: Feb. 28, 2014

(87) PCT Pub. No.: WO2013/031385
PCT Pub. Date: Mar. 7, 2013

(65) Prior Publication Data
US 2014/0228197 A1    Aug. 14, 2014

(30) Foreign Application Priority Data

Sep. 2, 2011    (JP) .................................. 2011-191448

(51) Int. Cl.
| | | |
|---|---|---|
| *C03C 3/16* | (2006.01) | |
| *C03C 3/21* | (2006.01) | |
| *C03C 3/19* | (2006.01) | |
| *C03C 3/17* | (2006.01) | |

(52) U.S. Cl.
CPC ... *C03C 3/21* (2013.01); *C03C 3/16* (2013.01); *C03C 3/17* (2013.01); *C03C 3/19* (2013.01)

(58) Field of Classification Search
CPC .............. C03C 3/16; C03C 3/21; C03C 3/12; C03C 3/19
USPC .......................................... 501/45, 46, 41, 47
See application file for complete search history.

(56) References Cited

U.S. PATENT DOCUMENTS

| 4,261,751 A | 4/1981 | Nakamura et al. | |
| 6,743,743 B2 * | 6/2004 | Sato ................................ | 501/47 |
| 2002/0042337 A1 * | 4/2002 | Zou et al. ........................ | 501/45 |
| 2002/0151424 A1 | 10/2002 | Sato | |
| 2005/0003948 A1 * | 1/2005 | Yamazaki ....................... | 501/45 |
| 2006/0128549 A1 * | 6/2006 | Hormadaly ..................... | 501/45 |
| 2006/0150682 A1 * | 7/2006 | Fujiwara et al. ................ | 65/102 |
| 2009/0097146 A1 * | 4/2009 | Oogaki .......................... | 359/894 |

FOREIGN PATENT DOCUMENTS

| JP | 54-112915 | 9/1979 |
| JP | 62-100451 | 5/1987 |
| JP | 07-097234 | 4/1995 |
| JP | 2002-293572 | 10/2002 |

* cited by examiner

*Primary Examiner* — Anthony J Green
*Assistant Examiner* — Elizabeth A Bolden
(74) *Attorney, Agent, or Firm* — Cozen O'Connor

(57) ABSTRACT

This optical glass contains, as represented by mol %, 18 to 38% $P_2O_5$, 0 to 15% $B_2O_3$, 23 to 40% $P_2O_5+B_2O_3$, 4 to 28% $Nb_2O_5$, 0 to 20% $TiO_2$, 10 to 30% $Nb_2O_5+TiO_2$, 15 to 35% $Li_2O+Na_2O+K_2O$, and 21 to 38% ZnO, but does not contain BaO, $WO_3$, $Bi_2O_3$ or $SiO_2$, and the ratio of the mol % of ZnO to the total mol % of $Li_2O+Na_2O+K_2O$ (i.e., $ZnO/(Li_2O+Na_2O+K_2O)$) is 0.8 to 2.0.

7 Claims, 2 Drawing Sheets

OPTICAL GLASS

RELATED APPLICATIONS

This is a U.S. National Phase Application under 35 USC 371 of International Application PCT/JP2012/067546 filed on Jul. 10, 2012.

This application claims the priority of Japanese application no. 2011-191448 filed Sep. 2, 2011, the entire content of which is hereby incorporated by reference.

TECHNICAL FIELD

The present invention relates to an optical glass. More particularly, the present invention relates to an optical glass suitable for use in liquid-drop molding and to an optical element made of the optical glass.

BACKGROUND ART

There has been a widespread use of various types of optical elements made of optical glasses, such as an imaging lens that is to be incorporated in a camera-equipped cellular phone and an optical pickup lens and a collimator lens that are to be incorporated in an optical disc device, and it has been increasingly demanded that such optical elements be produced with improved productivity at a reduced cost. Furthermore, as a glass molding method used for production of optical elements, there is known liquid-drop molding (direct precision press-molding). Liquid-drop molding is a molding method in which glass is allowed to drip through a nozzle, and drops of the dripping glass are directly received in a mold and then is pressed into a final shape. In this molding method, the temperature of the glass is controlled by controlling the temperature of the nozzle, and the size of the glass drops is controlled based on a relationship between the temperature and viscosity of the glass. Types of glass usable for this liquid-drop molding include, for example, those which are proposed in Patent Documents 1 to 3.

Patent Document 1 discloses types of glass having a refractive index (nd) of about 1.64 to 1.72, an Abbe number (vd) of 29 to 36, a glass deformation temperature (At) of 520° C. or lower, and a liquidus temperature (TL) of 900° C. or lower. Types of glass of Examples described in Patent Document 1 contain BaO having an increased effect of decreasing the liquidus temperature (TL) and further contain at least one of $WO_3$ and $Bi_2O_3$, which have an effect of decreasing the glass deformation temperature (At) and a glass transition temperature (Tg). Presumably, it is thanks to effective actions of these ingredients that the decreased liquidus temperature (TL) and the decreased glass deformation temperature (At) and glass transition temperature (Tg) are realized.

In a case of performing liquid-drop molding of glass of the type containing $WO_3$, however, when a mold made of tungsten carbide (WC) is used, due to a W ingredient contained in both of the glass and the mold, a reaction between the glass and the mold progresses, as a result of which the glass becomes fused to the mold to cause a mold life to be shortened. This renders this type of glass unsuitable for mass production. Furthermore, in a case of glass of the type containing $Bi_2O_3$, due to a low melting point of a $Bi_2O_3$ ingredient, a reaction between the glass and the mold progresses, so that, similarly to the above, the glass becomes fused to the mold to cause the mold life to be shortened. This renders this type of glass unsuitable for mass production. In Examples described in Patent Document 1, compositions having a refractive index (nd) of not less than 1.68 were found by actual measurement to have, at 100° C. to 300° C., a linear expansion coefficient ($\alpha$) exceeding $130 \times 10^{-7}/°$ C. Presumably, this is attributable to a content of ZnO as small as 0% to 15% by weight.

Patent Document 2 discloses types of low-melting point glass having a refractive index (nd) of about 1.69 to 1.83, an Abbe number (vd) of 21 to 35, and a glass deformation temperature (At) of 570° C. or lower. These types of glass, however, all contain $WO_3$, and thus when a mold made of tungsten carbide (WC) is used, a reaction between each of the types of glass and the mold progresses, as a result of which the each of the types of glass becomes fused to the mold to cause a mold life to be shortened. This renders these types of glass unsuitable for mass production.

Patent Document 3 discloses a type of glass having a refractive index (nd) of 1.6855 and an Abbe number (vd) of 34.7. This type of glass had, as actual measurement values, a glass transition temperature (Tg) of 476° C., a glass deformation temperature (At) of 519° C., a linear expansion coefficient ($\alpha$) of $109 \times 10^{-7}/°$ C., and a liquidus temperature (TL) of 980° C. or higher. Presumably, the increased liquidus temperature (TL) is attributable to a content of a ZnO ingredient as excessive as 48.94 mol %. Due to the increased liquidus temperature (TL), it becomes likely that the glass is devitrified in a nozzle, which renders the glass unsuitable for mass production.

LIST OF CITATIONS

Patent Literature

Patent Document 1: JP-A-2002-293572
Patent Document 2: JP-A-H7-97234
Patent Document 3: JP-A-S54-112915

SUMMARY OF THE INVENTION

Technical Problem

As described earlier, direct precision press-molding (liquid-drop molding) of glass is performed in the following manner. That is, glass is allowed to drip through a nozzle directly to a mold at a temperature in a range in the neighborhood of the glass transition temperature (Tg) to the glass deformation temperature (At) and then is pressed. Typically, a nozzle temperature is set to the order of 1200° C. to 900° C., and drops of the dripping glass thus being at a high temperature come in contact with the mold and are subjected to press-molding. In a case where the glass transition temperature (Tg) exceeds 500° C., a mold temperature exceeds 550° C., and thus as a result of the glass at a high temperature coming in contact with a mold surface, a reaction between the mold and the glass is accelerated. This has been a factor causing a mold life to be shortened.

Moreover, in a case where tungsten carbide (WC) is used as a material of a mold, since, as described earlier, glass of the type containing $WO_3$ readily reacts with a mold surface, the glass becomes fused to the mold in a short time. If a thus fused portion of the glass comes off, leaving behind a flaw on the mold surface, the flaw is transferred onto a surface of an optical element and leads to a malfunction of the optical element. Furthermore, also in a case where $Bi_2O_3$ having a low melting point is present among glass ingredients, since glass made of such ingredients readily reacts with a mold, there is a problem similar to the above-described problem.

Liquid-drop molding of glass is carried out, with the glass set to have such a viscosity that variations in weight are unlikely to occur. This requires that the liquidus temperature (TL) be lower than a temperature at which a viscosity favorable for the liquid-drop molding is obtained. That is, it is required that the liquidus temperature (TL) be 900° C. or lower. Furthermore, if glass has, at the time of press-molding and at the time of being cooled after having been pressed, a large linear expansion coefficient α (+100° C. to +300° C.), thermal stress becomes large, making it likely that cracking, chipping, and so on occur. In a direct precision press method involving quenching of glass, a linear expansion coefficient α (+100° C. to +300° C.) exceeding $130 \times 10^{-7}$/° C. leads to frequent occurrence of cracking and thus has been particularly problematic. It is therefore desirable that glass have a linear expansion coefficient α (+100° C. to +300° C.) of not more than $130 \times 10^{-7}$/° C. Moreover, taking into consideration a work environment at the time of production, it has been desired that PbO, fluorine compounds, $As_2O_3$, BaO, $TeO_2$, $Tl_2O$, and CdO be not contained in glass.

The present invention has been made in view of the foregoing circumstances and has as its object to provide an optical glass that does not contain BaO, $WO_3$, and $Bi_2O_3$, has a glass transition temperature (Tg) of 500° C. or lower, a linear expansion coefficient (α) at 100° C. to 300° C. of not more than $130 \times 10^{-7}$/° C., a liquidus temperature (TL) of 900° C. or lower, and medium-refractivity high-dispersion optical constants with a refractive index (nd) of 1.68 to 1.78 and an Abbe number (vd) of 26 to 35, and thus is favorable for use in liquid-drop molding, and an optical element made of the optical glass.

Solution to the Problem

In order to achieve the above-described object, an optical glass of the present invention contains, by mole: 18% to 38% of $P_2O_5$; 0% to 15% of $B_2O_3$, where $P_2O_5+B_2O_3$ equals 23% to 40%; 4% to 28% of $Nb_2O_5$; 0% to 20% of $TiO_2$, where $Nb_2O_5+TiO_2$ equals 10% to 30%; 15% to 35% of $Li_2O+Na_2O+K_2O$; and 21% to 38% of ZnO. In the optical glass, BaO, $WO_3$, $Bi_2O_3$, and $SiO_2$ are not contained, and a ratio $ZnO/(Li_2O+Na_2O+K_2O)$ of a mol % of ZnO to a total mol % of $Li_2O+Na_2O+K_2O$ is 0.8 to 2.0. Hereinafter, unless otherwise stated, "%" stands for "mol %."

Furthermore, an optical element of the present invention is made of the above-described optical glass. An example of such an optical element is a lens, a prism, or a glass for a reflection mirror.

Advantageous Effects of the Invention

The optical glass of the present invention contains predetermined glass ingredients in respective given contents and thus can realize a stable glass material that does not contain BaO, $WO_3$, and $Bi_2O_3$, has a glass transition temperature (Tg) of 500° C. or lower, a linear expansion coefficient (α) at 100° C. to 300° C. of not more than $130 \times 10^{-7}$/° C., a liquidus temperature (TL) of 900° C. or lower, and medium-refractivity high-dispersion optical constants with a refractive index (nd) of 1.68 to 1.78 and an Abbe number (vd) of 26 to 35, and thus is favorable for use in liquid-drop molding. Furthermore, the optical element of the present invention can be fabricated by liquid-drop molding of the optical glass and thus, while having characteristics of the optical glass, can be produced with high production efficiency at a reduced cost.

DESCRIPTION OF EMBODIMENTS

Figure 1:
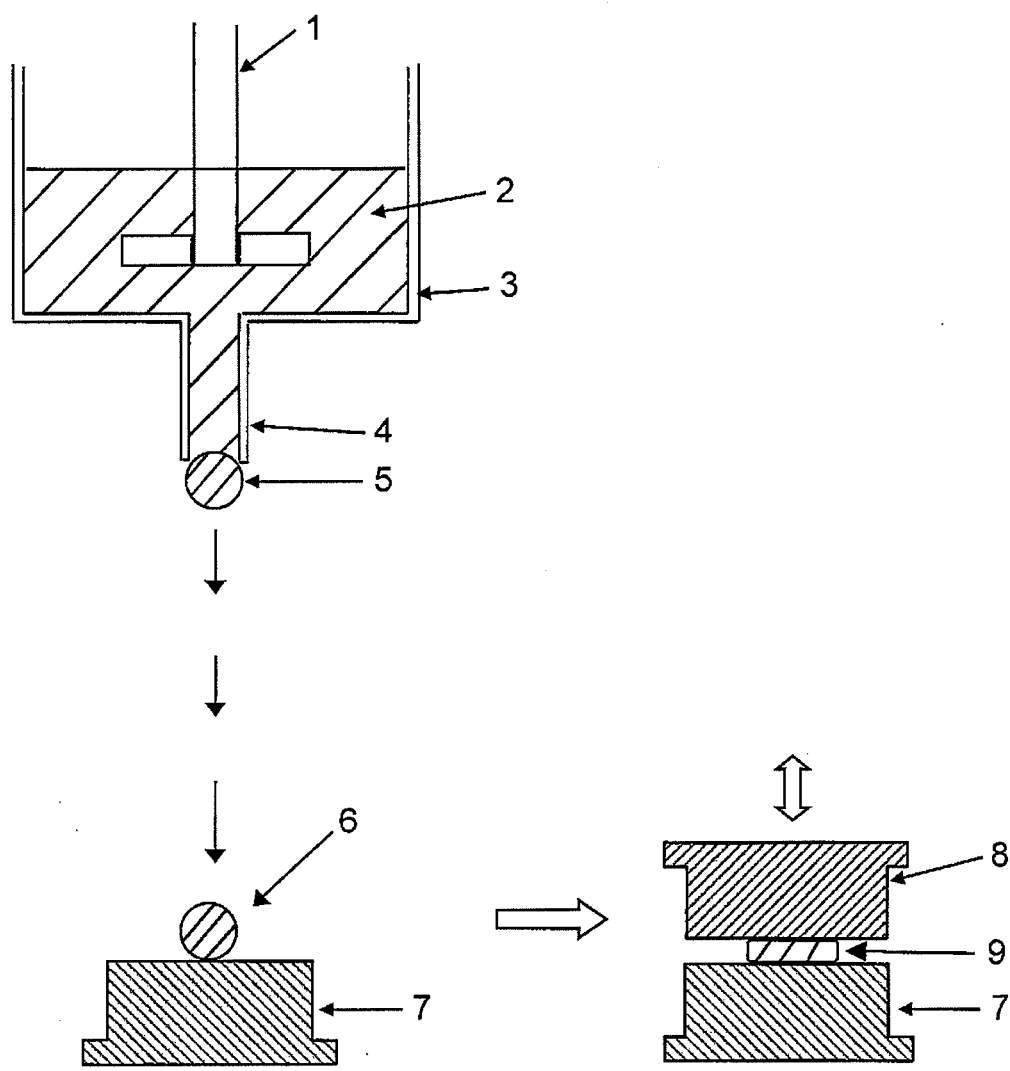
[FIG. 1] is a schematic process diagram showing a first specific example of fabricating a lens by liquid-drop molding.

Hereinafter, as to ranges of the contents of different ingredients in the optical glass of the present invention, reasons for restricting them as noted above will be described along with other features.

$P_2O_5$ is a main ingredient forming glass and is an essential ingredient. A content thereof less than 18% makes it impossible to obtain stable glass. Furthermore, a content thereof exceeding 38% results in a deterioration in weather resistance. For these reasons, the content of $P_2O_5$ is set to 18% to 38%. A preferred range of the content thereof is 20% to 36%. Further preferably, the content thereof is 25% to 30%.

$B_2O_3$ is effective in stabilizing glass. A content thereof exceeding 15%, however, leads to an increase in the liquidus temperature (TL), making it difficult to maintain the liquidus temperature (TL) at 900° C. or lower. For this reason, the content of $B_2O_3$ is set to 0% to 15%. A preferred range of the content thereof is 0% to 10%. Further preferably, the content thereof is 0% to 8%.

Taking it into consideration to decrease Tg, TL, and α, the total content of $P_2O_5$ and $B_2O_3$ is set to be in a range of 23 mol % to 40 mol %. A preferred range of the total content thereof is a range of 24% to 38%. Further preferably, the total content thereof is in a range of 26% to 34%.

$Nb_2O_5$ has an effect of increasing the refractive index (nd) to provide greater dispersion and decrease a numerical value of the Abbe number (vd). A content thereof not less than 4% stabilizes glass. A content thereof exceeding 28%, however, leads to an abrupt increase in the liquidus temperature (TL), making it difficult to maintain the liquidus temperature (TL) at 900° C. or lower. For these reasons, the content of $Nb_2O_5$ is set to 4% to 28%. A preferred range of the content thereof is 5% to 23%. Further preferably, the content thereof is 9% to 17%.

$TiO_2$ also has an effect of increasing the refractive index to decrease the Abbe number (vd), and when used together with $Nb_2O_5$, exhibits an effect of decreasing the liquidus temperature (TL). A content thereof exceeding 20%, however, makes it likely that glass is colored. Thus, preferably, TiO2 is used in a content in a range of not more than 20%. A preferred range of the content thereof is 3% to 17%. Further preferably, the content thereof is 4% to 12%.

A total content of $Nb_2O_5$ and $TiO_2$ of less than 10% makes it difficult to obtain a target value of the Abbe number (vd) of not more than 35. Furthermore, a total content thereof exceeding 30% makes it difficult to maintain the glass transition temperature (Tg) at 500° C. or lower. For these reasons, the content of $Nb_2O_5+TiO_2$ is set to 10% to 30%. A preferred range of the content thereof is a range of 12% to 26%. Further preferably, the content thereof is in a range of 13% to 23%.

Ingredients $Li_2O$, $Na_2O$, and $K_2O$ all have an effect of decreasing the grass transition temperature (Tg) and the glass deformation temperature (At). A total content of $Li_2O$, $Na_2O$, and $K_2O$ of less than 15% leads to an increase in the liquidus temperature (TL), making it difficult to maintain the liquidus temperature (TL) at 900° C. or lower. Furthermore, a total content thereof exceeding 35% makes it likely that weather resistance is deteriorated. For these reasons, the content of $Li_2O+Na_2O+K_2O$ (a total of $R_2O$ where R=Li, Na, K) is set to 15% to 35%. A preferred range of the content thereof is 16% to 30%. Further preferably, the content thereof is 18% to 27%.

A content of each of $Li_2O$ and $Na_2O$ exceeding 32% makes it likely that glass evaporates, so that striae become likely to develop. For this reason, preferred ranges of the contents thereof are 0% to 32% for $Li_2O$ and 0% to 32% for $Na_2O$, and further preferred ranges of the contents thereof are 0% to 28% for $Li_2O$ and 0% to 30% for $Na_2O$. Still further preferred ranges of the contents thereof are 0% to 25% for $Li_2O$ and 0% to 25% for $Na_2O$.

As compared with $Li_2O$ and $Na_2O$, $K_2O$ acts to somewhat increase the linear expansion coefficient ($\alpha$) and also to somewhat adversely affect the liquidus temperature (TL). Because of this, a content thereof exceeding 30% makes it difficult to maintain the linear expansion coefficient ($\alpha$) at not more than $130 \times 10^{-7}/°C$. and to maintain the liquidus temperature (TL) at 900° C. or lower. For this reason, a preferred range of the content of $K_2O$ is 0% to 30%, and particularly preferred is a range of the content thereof of 0% to 25%. A further preferred range of the content thereof is 0% to 23%, and a still further preferred range of the content thereof is 0% to 15%.

From the viewpoint of decreasing Tg, $\alpha$, and TL, the most favorable ranges of the contents of $Li_2O$, $Na_2O$, and $K_2O$ are a range of 2% to 15% for $Li_2O$, a range of 5% to 20% for $Na_2O$, and a range of 0% to 12% for $K_2O$.

ZnO has an effect of increasing the refractive index, decreasing the glass transition temperature (Tg) and the glass deformation temperature (At), and decreasing the linear expansion coefficient ($\alpha$). A content thereof less than 21% is not sufficient for the effect to be exerted, and a content thereof exceeding 38% makes it likely that glass is devitrified, thus making it difficult to achieve a liquidus temperature (TL) of 900° C. or lower. For these reasons, the content of ZnO is set to 21% to 38%. A preferred range of the content thereof is 22% to 36%. Further preferably, the content thereof is 24% to 34%.

By setting a ratio $ZnO/(Li_2O+Na_2O+K_2O)$ of a mol % of ZnO to a total mol % of $Li_2O+Na_2O+K_2O$ to a range of 0.8 to 2.0, it becomes easy to maintain the linear expansion coefficient ($\alpha$) at not more than $130 \times 10^{-7}/°C$., to maintain the glass transition temperature (Tg) at 500° C. or lower, and to achieve a liquidus temperature (TL) of 900° C. or lower. Preferably, this ratio $ZnO/(Li_2O+Na_2O+K_2O)$ is in a range of 0.9 to 1.5. Further preferably, this ratio is in a range of 1.0 to 1.3.

MgO, CaO, and SrO each has an effect of decreasing the liquidus temperature (TL) and can be used to adjust optical constants by being substituted for ZnO. These ingredients, however, tend to increase the glass transition temperature (Tg) and the glass deformation temperature (At) as compared with ZnO, and thus, preferably, each of them is used in a content of not more than 15% (MgO: 0% to 15%, CaO: 0% to 15%, SrO: 0% to 15%). Further preferred ranges of the contents thereof are 0% to 10% for MgO, 0% to 12% for CaO, and 0% to 12% for SrO. Still further preferred ranges of the contents thereof are 0% to 5% for MgO, 0% to 10% for CaO, and 0% to 10% for SrO.

$Sb_2O_3$ and $SnO_2$ can be used as a clarifying agent or a decolorizing agent at the time of melting. It is sufficient to use them in a content of 0% to 0.5%, respectively ($Sb_2O_3$: 0% to 0.5%, $SnO_2$: 0% to 0.5%). Preferably, they are not contained unless required.

$Al_2O_3$ is an ingredient effective in obtaining weather resistance. In a composition range having a large content of ZnO as in the present invention, however, a content of $Al_2O_3$ exceeding 3% makes it likely that glass is devitrified. For this reason, a preferred range of the content of $Al_2O_3$ is 0% to 3%, and a further preferred range of the content thereof is 0% to 2%. Most preferably, $Al_2O3$ is not used unless there is a problem with weather resistance.

$La_2O_3$, $Gd_2O_3$, $Y_2O_3$, and $Ta_2O_5$ can be used to adjust optical constants. These ingredients, however, all adversely affect the liquidus temperature (TL), and thus, preferably, each of them is used in a content of not more than 3% ($La_2O_3$: 0% to 3%, $Gd_2O_3$: 0% to 3%, $Y_2O_3$: 0% to 3%, $Ta_2O_5$: 0% to 3%). A further preferred range of the content of each of them is 0% to 1%. Most preferably, they are not contained unless required.

As for $SiO_2$ and $ZrO_2$, when these ingredients are introduced in glass with a composition range having a large content of ZnO as in the present invention, it becomes likely that stability of glass is extremely deteriorated to cause the glass to be devitrified and thus, preferably, they are not contained.

$WO_3$ and $Bi_2O_3$ are ingredients that decrease the liquidus temperature (TL) of glass and decrease the glass transition temperature (Tg) and the glass deformation temperature (At). These ingredients, however, significantly accelerate a reaction between glass and a mold, causing the glass to become fused to the mold, and thus, preferably, are not contained.

BaO is an ingredient effective in decreasing the liquidus temperature (TL). This ingredient, however, falls under the category of deleterious substances specified in the Poisonous and Deleterious Substances Control Law and thus, preferably, is not contained.

$As_2O_3$ falls under the category of poisonous substances specified in the Poisonous and Deleterious Substances Control Law and thus, preferably, is not contained. As for an F ingredient (fluorides), PbO, $TeO_2$, $Tl_2O$, and CdO, from the viewpoint of taking into consideration a work environment at the time of production and securing operator's safety, preferably, none of these ingredients are contained. $GeO_2$ is a costly source material and thus, preferably, is not contained.

In order to realize further stable mass productivity of the optical glass according to the present invention, the glass transition temperature (Tg), preferably, is 500° C. or lower, further preferably, is decreased to 480° C. or lower, still further preferably, is decreased to 460° C. or lower, and most preferably, is decreased to 450° C. or lower. Furthermore, the glass deformation temperature (At) is decreased to be in a range of, preferably, 550° C. or lower, further preferably, 520° C. or lower, and still further preferably, 500° C. or lower.

The linear expansion coefficient ($\alpha$) at 100° C. to 300° C. is, preferably, not more than $130 \times 10^{-7}/°C$., further preferably, not more than $125 \times 10^{-7}/°C$., still further preferably, not more than $120 \times 10^{-7}/°C$., and most preferably, not more than $118 \times 10^{-7}/°C$. The liquidus temperature (TL) is 900° C. or lower, preferably, 860° C. or lower, further preferably, 840° C. or lower, and still further preferably, 820° C. or lower. It is preferable to have optical constants with a refractive index (nd) for the d-line in a range of 1.68 to 1.78 and an Abbe number (vd) in a range of 26 to 35, and it is more preferable to set nd to 1.69 to 1.72 and vd to 28 to 33.

The optical glass according to the present invention can be used as an optical element (for example, a lens, a prism, a glass for a reflection mirror, or the like) that is to be incorporated in an optical device such as a digital camera, a camera-equipped cellular phone, or the like. Furthermore, as a method for molding this optical glass into an optical element, a direct precision press method (liquid-drop molding method) can be used. As described earlier, this method is a method in which, from a nozzle through which glass is being allowed to flow out, a required weight of drops of the glass are separated to be allowed to drip directly onto a heated mold and then is press-molded into the shape of a final product. This method eliminates the need for grinding and polishing processes, thus improving productivity, and can provide an optical element having a shape difficult to form, such as a free-form curved surface or an aspherical surface. Thus, high production efficiency and a cost reduction can be achieved.

FIG. 1 shows a first specific example of fabricating a lens by liquid-drop molding. As shown in FIG. 1, molten glass 2 in a glass melting crucible 3 is stirred with a stirring rod 1 and then is extruded through a nozzle 4 so that a glass drop 5 is allowed to drip onto a lower mold 7. A glass drop 6 that has dripped onto the lower mold 7 is press-molded by using an upper mold 8, and thus a lens-shaped glass component 9 is obtained.

Figure 2:
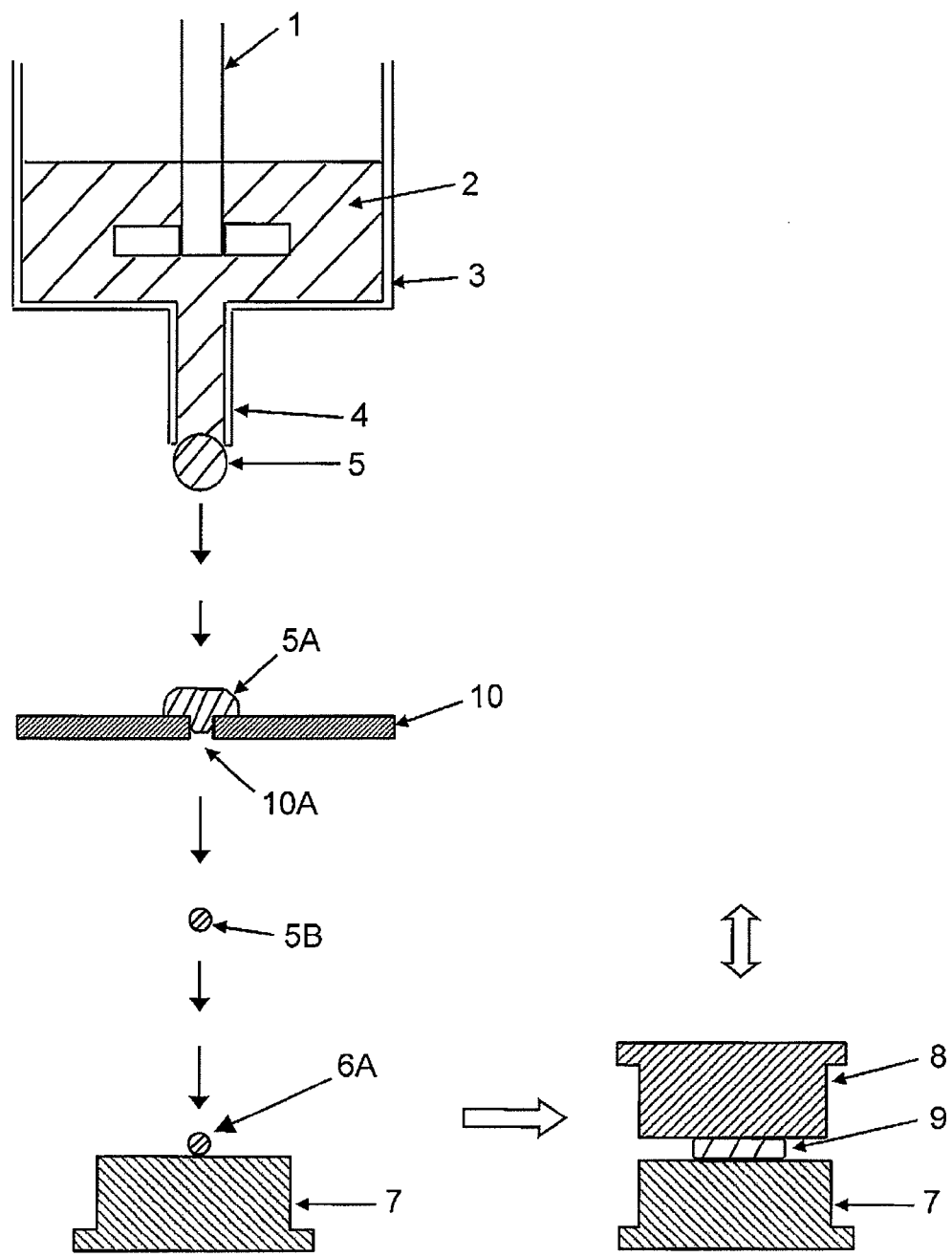
[FIG. 2] is a schematic process diagram showing a second specific example of fabricating a lens by liquid-drop molding.

FIG. 2 shows a second specific example of fabricating a lens by liquid-drop molding. As shown in FIG. 2, molten glass 2 in a glass melting crucible 3 is stirred with a stirring rod 1 and then is extruded through a nozzle 4 so that a glass drop 5 is allowed to drip onto a member 10 having a micro-through hole 10A formed therethrough. Part of a glass drop 5A being about to enter the micro-through hole 10A passes through the micro-through hole 10A to become a minute glass drop 5B. A minute glass drop 6A that has dripped onto a lower mold 7 is press-molded by using an upper mold 8, and thus a lens-shaped glass component 9 is obtained.

EXAMPLES

Hereinafter, configurations and other features of optical glasses to which the present invention is applied will be more specifically described by way of Practical Examples 1 to 103 and Comparison Examples 1 to 3. Comparison Example 1 has a composition obtained by converting into mol % the composition of Example 8 in Patent Document 3 mentioned earlier, Comparative Example 2 has a composition obtained by converting into mol % the composition of Example 3 in Patent Document 1 mentioned earlier, and Comparative Example 3 has a composition obtained by converting into mol % the composition of Example 35 in Patent Document 1 mentioned earlier.

Oxides, hydroxides, carbonates, phosphates, and nitrates as source materials were weighted and blended at respective predetermined ratios into blended materials having target compositions (mol %) shown in Tables 1 to 14, respectively. Then, each of these blended materials was put in a platinum crucible where it was melted at a temperature of 1000° C. to 1300° C. for one to three hours and stirred to be homogenized, after which it was poured into a mold or the like and gradually cooled down. In this way, samples of Practical Examples 1 to 103 and Comparative Examples 1 to 3 were fabricated. With respect to each of these samples, the refractive index (nd) for the d-line, the Abbe number (vd), the glass transition temperature (Tg), the glass deformation temperature (At), the linear expansion coefficient (α), and the liquidus temperature (TL) were measured. Results of the measurements are shown, together with the compositions, in Tables 1 to 14.

(Measures to Evaluate Physical Properties)

The measurements of the refractive index (nd), the Abbe number (vd), the glass transition temperature (Tg), and the linear expansion coefficient (α) were performed pursuant to a test method specified in the Japan Optical Glass Industry Standard (JOGIS). With respect to the samples obtained by, as described earlier, gradually cooling down glass poured into the mold at a cooling rate of −50° C./hour to room temperature (25° C.), the measurements of the refractive index (nd) and the Abbe number (vd) were performed by using a refractometer "KPR-200" manufactured by Kalnew Optical Industrial Co., Ltd. Furthermore, the measurements of the glass transition temperature (Tg) and the glass deformation temperature (At) and the measurement of the linear expansion coefficient (α) at 100° C. to 300° C. were performed by using a thermo-mechanical analyzer "TMA/SS6000" manufactured by Seiko Instruments Inc. under a condition that the temperature is raised by 10° C. per minute. The results of the measurement of the liquidus temperature (TL) were obtained in the following manner. That is, the glass was kept in a devitrification testing furnace having a temperature gradient of 500° C. to 1000° C. for 30 minutes, and, after being taken out therefrom, by using a microscope with a magnification of 40 times, the glass was observed as to whether or not devitrification had occurred therein. The result of the measurement of the liquidus temperature (TL) of Comparative Example 1 was obtained under the same conditions as those for Practical Examples.

As can be understood from the measurement results shown in Tables 1 to 14, each of Practical Examples 1 to 103 (Tables 1 to 13) has a glass transition temperature (Tg) of 500° C. or lower, a linear expansion coefficient (α) at 100° C. to 300° C. of not more than $130 \times 10^{-7}/°$ C., a liquidus temperature (TL) of 900° C. or lower, and medium-refractivity high-dispersion optical constants with a refractive index (nd) of 1.68 to 1.78 and an Abbe number (vd) of 26 to 35. On the other hand, Comparative Example 1 (Table 14) has a liquidus temperature (TL) exceeding 900° C. Furthermore, each of Comparative Examples 2 and 3 (Table 14) has a linear expansion coefficient (α) at 100° C. to 300° C. exceeding $130 \times 10^{-7}/°$ C. and contains BaO and/or $WO_3$.

[Table 1]
[Table 2]
[Table 3]
[Table 4]
[Table 5]
[Table 6]
[Table 7]
[Table 8]
[Table 9]
[Table 10]
[Table 11]
[Table 12]
[Table 13]
[Table 14]

TABLE 1

| | Practical Example No (mol %) | | | | | | | |
|---|---|---|---|---|---|---|---|---|
| | 1 | 2 | 3 | 4 | 5 | 6 | 7 | 8 |
| P2O5 | 25.83 | 29.47 | 26.87 | 27.73 | 26.35 | 28.92 | 27.60 | 29.14 |
| B2O3 | | | | | | | | |
| Li2O | | 2.50 | 7.68 | | | 15.00 | 14.60 | 24.19 |
| Na2O | 15.00 | 11.58 | 17.16 | 16.15 | 13.94 | 11.60 | 10.43 | |
| K2O | 10.00 | 9.47 | 0.81 | 9.66 | 10.76 | | 0.80 | 0.81 |
| ZnO | 34.07 | 30.43 | 33.03 | 31.17 | 30.55 | 30.98 | 32.30 | 30.76 |

TABLE 1-continued

| | Practical Example No (mol %) | | | | | | | |
|---|---|---|---|---|---|---|---|---|
| | 1 | 2 | 3 | 4 | 5 | 6 | 7 | 8 |
| Nb2O5 | 11.50 | 10.00 | 9.67 | 11.84 | 12.56 | 8.96 | 10.00 | 10.00 |
| TiO2 | 3.60 | 6.55 | 4.78 | 2.45 | 3.60 | 4.54 | 4.26 | 5.10 |
| MgO | | | | | | | | |
| CaO | | | | 0.50 | 0.74 | | | |
| SrO | | | | 0.50 | 1.50 | | | |
| Sb2O3 | | | | | | | 0.01 | |
| Total | 100.0 | 100.0 | 100.0 | 100.0 | 100.0 | 100.0 | 100.0 | 100.0 |
| Li2O + Na2O + K2O | 25.00 | 23.55 | 25.65 | 25.81 | 24.70 | 26.60 | 25.83 | 25.00 |
| ZnO/R2O | 1.36 | 1.29 | 1.29 | 1.21 | 1.24 | 1.16 | 1.25 | 1.23 |
| Nb2O5 + TiO2 | 15.10 | 16.55 | 14.45 | 14.29 | 16.16 | 13.50 | 14.26 | 15.10 |
| P2O5 + B2O3 | 25.83 | 29.47 | 26.87 | 27.73 | 26.35 | 28.92 | 27.60 | 29.14 |
| nd | 1.70393 | 1.69327 | 1.71014 | 1.68702 | 1.68489 | 1.70265 | 1.71810 | 1.73033 |
| νd | 31.12 | 30.85 | 31.56 | 32.56 | 31.32 | 32.71 | 31.6 | 31.27 |
| Tg(° C.) | 490 | 488 | 443 | 485 | 494 | 425 | 436 | 459 |
| At(° C.) | 536 | 537 | 490 | 535 | 543 | 473 | 482 | 506 |
| α(×10−7/° C.) | 118 | 119 | 121 | 125 | 116 | 126 | 119 | 107 |
| TL(° C.) | 830 | 810 | 820 | 790 | 850 | 800 | 850 | 840 |

TABLE 2

| | Practical Example No | | | | | | | |
|---|---|---|---|---|---|---|---|---|
| | 9 | 10 | 11 | 12 | 13 | 14 | 15 | 16 |
| P2O5 | 27.03 | 28.00 | 26.78 | 26.42 | 29.73 | 21.02 | 23.70 | 25.67 |
| B2O3 | | | | | | 2.31 | 4.02 | 3.62 |
| Li2O | 7.68 | 7.68 | 8.49 | 8.68 | 9.50 | | | |
| Na2O | 17.72 | 15.85 | 15.90 | 17.35 | 12.77 | 16.92 | 13.63 | 14.18 |
| K2O | | 0.80 | | 0.81 | | 8.87 | 7.10 | 10.24 |
| ZnO | 33.68 | 32.91 | 33.12 | 33.48 | 30.17 | 25.26 | 27.58 | 30.61 |
| Nb2O5 | 8.98 | 10.00 | 10.00 | 9.45 | 10.61 | 9.21 | 11.37 | 10.82 |
| TiO2 | 4.91 | 4.76 | 5.71 | 3.81 | 7.22 | 6.41 | 4.70 | 4.86 |
| MgO | | | | | | | | |
| CaO | | | | | | 5.00 | | |
| SrO | | | | | | 5.00 | 7.90 | |
| Sb2O3 | | | | | | | | |
| Total | 100.00 | 100.00 | 100.00 | 100.00 | 100.00 | 100.00 | 100.00 | 100.00 |
| Li2O + Na2O + K2O | 25.40 | 24.33 | 24.39 | 26.84 | 22.27 | 25.79 | 20.73 | 24.42 |
| ZnO/R2O | 1.33 | 1.35 | 1.36 | 1.25 | 1.35 | 0.98 | 1.33 | 1.25 |
| Nb2O5 + TiO2 | 13.89 | 14.76 | 15.71 | 13.26 | 17.83 | 15.62 | 16.07 | 15.68 |
| P2O5 + B2O3 | 27.03 | 28.00 | 26.78 | 26.42 | 29.73 | 23.33 | 27.72 | 29.29 |
| nd | 1.70512 | 1.71035 | 1.72500 | 1.70420 | 1.72894 | 1.71255 | 1.72146 | 1.69518 |
| νd | 32.23 | 30.45 | 30.17 | 32.55 | 28.74 | 31.35 | 30.59 | 31.12 |
| Tg(° C.) | 443 | 450 | 454 | 431 | 471 | 475 | 445 | 478 |
| At(° C.) | 489 | 498 | 501 | 477 | 519 | 527 | 538 | 532 |
| α(×10−7/° C.) | 121 | 117 | 112 | 126 | 103 | 124 | 104 | 123 |
| TL(° C.) | 810 | 800 | 850 | 820 | 850 | 820 | 880 | 850 |

TABLE 3

| | Practical Example No | | | | | | | |
|---|---|---|---|---|---|---|---|---|
| | 17 | 18 | 19 | 20 | 21 | 22 | 23 | 24 |
| P2O5 | 25.59 | 23.41 | 23.21 | 27.18 | 26.32 | 27.41 | 23.47 | 23.77 |
| B2O3 | 1.68 | 3.97 | 3.59 | 1.72 | 2.35 | 0.66 | 2.65 | 5.19 |
| Li2O | 2.50 | | | | 2.50 | 8.36 | | |
| Na2O | 15.57 | 13.68 | 12.53 | 26.02 | 10.44 | 13.75 | 15.31 | 14.76 |
| K2O | 7.50 | 10.00 | 8.80 | | 11.27 | 0.64 | 8.78 | 8.43 |
| ZnO | 30.69 | 27.87 | 23.11 | 30.67 | 29.96 | 29.10 | 29.81 | 30.51 |
| Nb2O5 | 9.43 | 11.32 | 9.09 | 8.98 | 11.20 | 9.70 | 9.69 | 9.37 |
| TiO2 | 7.04 | 4.75 | 6.59 | 5.43 | 5.96 | 4.03 | 6.07 | 4.97 |
| MgO | | | | | | | | |

TABLE 3-continued

| | Practical Example No | | | | | | | |
|---|---|---|---|---|---|---|---|---|
| | 17 | 18 | 19 | 20 | 21 | 22 | 23 | 24 |
| CaO | | 5.00 | 6.50 | | | 4.10 | 2.72 | 1.50 |
| SrO | | | 6.58 | | | 2.25 | 1.50 | 1.50 |
| $Sb_2O_3$ | | | | | | | | |
| Total | 100.00 | 100.00 | 100.00 | 100.00 | 100.00 | 100.00 | 100.00 | 100.00 |
| $Li_2O + Na_2O + K_2O$ | 25.57 | 23.68 | 21.33 | 26.02 | 24.21 | 22.75 | 24.09 | 23.19 |
| $ZnO/R_2O$ | 1.20 | 1.18 | 1.08 | 1.18 | 1.24 | 1.28 | 1.24 | 1.32 |
| $Nb_2O_5 + TiO_2$ | 16.47 | 16.07 | 15.68 | 14.41 | 17.16 | 13.73 | 15.76 | 14.34 |
| $P_2O_5 + B_2O_3$ | 27.27 | 27.38 | 26.80 | 28.90 | 28.67 | 28.07 | 26.12 | 28.96 |
| $n_d$ | 1.70460 | 1.71297 | 1.70852 | 1.68267 | 1.69258 | 1.70910 | 1.70607 | 1.69207 |
| $v_d$ | 30.33 | 30.41 | 31.96 | 32.92 | 29.51 | 32.90 | 30.89 | 32.56 |
| $T_g$(° C.) | 465 | 485 | 492 | 468 | 478 | 450 | 483 | 461 |
| $A_t$(° C.) | 519 | 536 | 547 | 522 | 527 | 503 | 535 | 509 |
| $\alpha(\times 10^{-7}/°C.)$ | 122 | 117 | 119 | 127 | 117 | 118 | 120 | 122 |
| TL (° C.) | 840 | 860 | 810 | 800 | 830 | 820 | 850 | 870 |

TABLE 4

| | Practical Example No | | | | | | | |
|---|---|---|---|---|---|---|---|---|
| | 25 | 26 | 27 | 28 | 29 | 30 | 31 | 32 |
| $P_2O_5$ | 24.45 | 22.62 | 26.11 | 23.85 | 23.94 | 22.97 | 27.38 | 24.84 |
| $B_2O_3$ | 4.55 | 2.12 | 4.16 | 4.20 | 3.60 | 4.65 | | 2.40 |
| $Li_2O$ | | | | | | | | |
| $Na_2O$ | 13.26 | 16.04 | 13.97 | 15.51 | 15.00 | 16.03 | 16.43 | 15.58 |
| $K_2O$ | 9.21 | 9.00 | 9.46 | 7.84 | 6.99 | 7.02 | 10.00 | 8.37 |
| ZnO | 28.90 | 31.66 | 27.17 | 30.43 | 25.36 | 30.31 | 29.52 | 22.66 |
| $Nb_2O_5$ | 11.74 | 8.96 | 12.53 | 10.65 | 8.50 | 8.97 | 13.67 | 16.15 |
| $TiO_2$ | 4.89 | 6.60 | 3.60 | 4.52 | 8.60 | 7.05 | | |
| MgO | | | | | | | | |
| CaO | 1.50 | 1.50 | 1.50 | 1.50 | 2.50 | 1.50 | 1.50 | 5.00 |
| SrO | 1.50 | 1.50 | 1.50 | 1.50 | 5.51 | 1.50 | 1.50 | 5.00 |
| $Sb_2O_3$ | | | | | | | | |
| Total | 100.00 | 100.00 | 100.00 | 100.00 | 100.00 | 100.00 | 100.00 | 100.00 |
| $Li_2O + Na_2O + K_2O$ | 22.47 | 25.04 | 23.43 | 23.35 | 21.99 | 23.05 | 26.43 | 23.95 |
| $ZnO/R_2O$ | 1.29 | 1.26 | 1.16 | 1.30 | 1.15 | 1.31 | 1.12 | 0.95 |
| $Nb_2O_5 + TiO_2$ | 16.63 | 15.56 | 16.13 | 15.17 | 17.10 | 16.02 | 13.67 | 16.15 |
| $P_2O_5 + B_2O_3$ | 29.00 | 24.74 | 30.27 | 28.05 | 27.54 | 27.62 | 27.38 | 27.24 |
| $n_d$ | 1.71477 | 1.70716 | 1.70339 | 1.70633 | 1.70859 | 1.71003 | 1.69132 | 1.72627 |
| $v_d$ | 29.79 | 30.95 | 30.58 | 31.27 | 31.03 | 30.78 | 32.58 | 29.86 |
| $T_g$(° C.) | 492 | 474 | 491 | 480 | 487 | 481 | 479 | 493 |
| $A_t$(° C.) | 542 | 528 | 542 | 528 | 536 | 530 | 529 | 542 |
| $\alpha(\times 10^{-7}/°C.)$ | 113 | 122 | 116 | 115 | 113 | 113 | 127 | 118 |
| TL(° C.) | 840 | 850 | 830 | 850 | 870 | 870 | 810 | 870 |

| | Practical Example No | | | | | | | |
|---|---|---|---|---|---|---|---|---|
| | 33 | 34 | 35 | 36 | 37 | 38 | 39 | 40 |
| $P_2O_5$ | 27.19 | 25.03 | 21.72 | 26.21 | 23.70 | 25.11 | 26.90 | 27.17 |
| $B_2O_3$ | 1.91 | 3.59 | 7.60 | 2.17 | 2.95 | 4.32 | | |
| $Li_2O$ | | | | 7.68 | | | 8.68 | 15.00 |
| $Na_2O$ | 15.00 | 15.00 | 15.43 | 17.65 | 15.14 | 13.54 | 11.72 | 14.44 |
| $K_2O$ | 7.63 | 8.41 | 9.00 | 0.81 | 10.67 | 9.60 | 2.80 | |
| ZnO | 26.17 | 25.86 | 28.58 | 31.52 | 25.58 | 29.17 | 34.10 | 28.63 |
| $Nb_2O_5$ | 5.60 | 8.50 | 8.52 | 9.26 | 9.86 | 11.86 | 10.90 | 10.81 |
| $TiO_2$ | 11.50 | 8.60 | 6.15 | 4.70 | 7.10 | 4.40 | 4.90 | 3.95 |
| MgO | | 1.30 | | | | | | |
| CaO | 2.50 | 1.20 | 1.50 | | 2.50 | 1.00 | | |
| SrO | 2.50 | 2.50 | 1.50 | | 2.50 | 1.00 | | |
| $Sb_2O_3$ | | 0.01 | | | | | | |
| Total | 100.00 | 100.00 | 100.00 | 100.00 | 100.00 | 100.00 | 100.00 | 100.00 |
| $Li_2O + Na_2O + K_2O$ | 22.63 | 23.41 | 24.43 | 26.14 | 25.81 | 23.14 | 23.20 | 29.44 |
| $ZnO/R_2O$ | 1.16 | 1.10 | 1.17 | 1.21 | 0.99 | 1.26 | 1.47 | 0.97 |
| $Nb_2O_5 + TiO_2$ | 17.10 | 17.10 | 14.67 | 13.96 | 16.96 | 16.26 | 15.80 | 14.76 |
| $P_2O_5 + B_2O_3$ | 29.10 | 28.62 | 29.32 | 28.38 | 26.65 | 29.43 | 26.90 | 27.17 |
| $n_d$ | 1.68383 | 1.69770 | 1.69409 | 1.70284 | 1.70513 | 1.70625 | 1.72453 | 1.70943 |

-continued

| | Practical Example No | | | | | | | |
|---|---|---|---|---|---|---|---|---|
| | 33 | 34 | 35 | 36 | 37 | 38 | 39 | 40 |
| νd | 32.43 | 31.2 | 32.09 | 32.26 | 30.79 | 30.28 | 30.29 | 31.72 |
| Tg(° C.) | 483 | 483 | 463 | 433 | 480 | 490 | 454 | 424 |
| At(° C.) | 532 | 531 | 510 | 480 | 529 | 540 | 500 | 473 |
| α(×10−7/° C.) | 126 | 120 | 127 | 127 | 126 | 114 | 108 | 129 |
| TL(° C.) | 770 | 860 | 850 | 840 | 830 | 870 | 890 | 800 |

TABLE 6

| | Practical Example No | | | | | | | |
|---|---|---|---|---|---|---|---|---|
| | 41 | 42 | 43 | 44 | 45 | 46 | 47 | 48 |
| P2O5 | 25.50 | 36.12 | 20.58 | 27.66 | 28.40 | 28.05 | 27.92 | 24.85 |
| B2O3 | 2.50 | | 7.42 | 1.41 | 0.81 | 0.78 | 0.90 | 1.95 |
| Li2O | | 7.68 | | 5.07 | 8.80 | 8.82 | 8.81 | 0.21 |
| Na2O | 4.90 | 8.39 | 15.00 | 10.83 | 13.25 | 14.42 | 13.90 | 16.15 |
| K2O | 20.10 | 0.81 | 9.62 | 8.03 | 0.64 | 0.64 | 0.64 | 7.92 |
| ZnO | 31.90 | 24.44 | 21.90 | 22.00 | 25.64 | 25.71 | 25.71 | 28.93 |
| Nb2O5 | 10.77 | 17.05 | 10.00 | 5.47 | 10.67 | 9.53 | 10.04 | 8.70 |
| TiO2 | 4.33 | 5.51 | 5.48 | 17.03 | 4.03 | 4.03 | 4.03 | 6.56 |
| MgO | | | | | | | | |
| CaO | | | 5.00 | 2.36 | 4.10 | 4.10 | 4.10 | 1.50 |
| SrO | | | 5.00 | 0.13 | 2.82 | 2.85 | 2.84 | 1.78 |
| Al2O3 | | | | | | | | 1.18 |
| La2O3 | | | | | | | 0.34 | |
| Gd2O3 | | | | | | 0.51 | | |
| Y2O3 | | | | | | | 0.21 | |
| Ta2O5 | | | | | 0.83 | 0.56 | 0.56 | 0.27 |
| Sb2O3 | | | | | | | | |
| SnO2 | | | | 0.01 | 0.01 | | | |
| Total | 100.00 | 100.00 | 100.00 | 100.00 | 100.00 | 100.00 | 100.00 | 100.00 |
| Li2O + Na2O + K2O | 25.00 | 16.88 | 24.62 | 23.93 | 22.69 | 23.88 | 23.35 | 24.28 |
| ZnO/R2O | 1.28 | 1.45 | 0.89 | 0.92 | 1.13 | 1.08 | 1.10 | 1.19 |
| Nb2O5 + TiO2 | 15.10 | 22.56 | 15.48 | 22.50 | 14.70 | 13.56 | 14.07 | 15.26 |
| P2O5 + B2O3 | 28.00 | 36.12 | 28.00 | 29.07 | 29.21 | 28.83 | 28.82 | 26.80 |
| nd | 1.68010 | 1.71467 | 1.70707 | 1.71483 | 1.72149 | 1.70982 | 1.71680 | 1.70289 |
| νd | 31.75 | 30.22 | 31.72 | 28.03 | 31.33 | 32.88 | 32.26 | 30.99 |
| Tg(° C.) | 477 | 490 | 464 | 486 | 467 | 457 | 462 | 479 |
| At(° C.) | 527 | 540 | 518 | 537 | 519 | 511 | 515 | 530 |
| α(×10−7/° C.) | 128 | 104 | 125 | 117 | 112 | 121 | 117 | 118 |
| TL(° C.) | 890 | 890 | 890 | 780 | 860 | 830 | 850 | 870 |

TABLE 7

| | Practical Example No | | | | | | | |
|---|---|---|---|---|---|---|---|---|
| | 49 | 50 | 51 | 52 | 53 | 54 | 55 | 56 |
| P2O5 | 27.60 | 27.91 | 27.83 | 25.96 | 27.89 | 28.83 | 28.94 | 28.39 |
| B2O3 | | | | | | | | |
| Li2O | | 2.46 | 7.67 | | | 15.00 | 14.60 | 26.99 |
| Na2O | 16.07 | 12.43 | 16.49 | 16.11 | 14.95 | 13.77 | 11.68 | |
| K2O | 9.90 | 9.94 | 0.80 | 11.47 | 9.97 | | 0.80 | 0.81 |
| ZnO | 31.87 | 32.47 | 32.29 | 31.47 | 29.31 | 28.87 | 29.46 | 28.71 |
| Nb2O5 | 14.56 | 14.79 | 14.92 | 13.99 | 14.88 | 13.53 | 14.51 | 15.10 |
| TiO2 | | | | | | | | |
| MgO | | | | | | | | |
| CaO | | | | 0.50 | 1.50 | | | |
| SrO | | | | 0.50 | 1.50 | | | |
| Sb2O3 | | | | | | | 0.01 | |
| Total | 100.00 | 100.00 | 100.00 | 100.00 | 100.00 | 100.00 | 100.00 | 100.00 |
| Li2O + Na2O + K2O | 25.97 | 24.83 | 24.96 | 27.58 | 24.92 | 28.77 | 27.08 | 27.80 |
| ZnO/R2O | 1.23 | 131 | 1.29 | 1.14 | 1.18 | 1.00 | 1.09 | 1.03 |
| Nb2O5 + TiO2 | 14.56 | 14.79 | 14.92 | 13.99 | 14.88 | 13.53 | 14.51 | 15.10 |
| P2O5 + B2O3 | 27.60 | 27.91 | 27.83 | 25.96 | 27.89 | 28.83 | 28.94 | 28.39 |
| nd | 1.69671 | 1.70770 | 1.72883 | 1.69752 | 1.70332 | 1.71448 | 1.72499 | 1.74615 |
| νd | 31.28 | 30.52 | 29.83 | 31.85 | 31.13 | 31.69 | 30.70 | 30.02 |
| Tg(° C.) | 494 | 483 | 457 | 482 | 494 | 427 | 442 | 459 |
| At(° C.) | 541 | 528 | 504 | 536 | 547 | 474 | 490 | 507 |

TABLE 7-continued

| | Practical Example No | | | | | | | |
|---|---|---|---|---|---|---|---|---|
| | 49 | 50 | 51 | 52 | 53 | 54 | 55 | 56 |
| α(×10 − 7/° C.) | 122 | 117 | 112 | 124 | 118 | 128 | 120 | 111 |
| TL(° C.) | 810 | 880 | 870 | 850 | 830 | 820 | 850 | 880 |

TABLE 8

| | Practical Example No | | | | | | | |
|---|---|---|---|---|---|---|---|---|
| | 57 | 58 | 59 | 60 | 61 | 62 | 63 | 64 |
| P2O5 | 28.56 | 27.84 | 29.36 | 28.35 | 26.94 | 23.24 | 25.60 | 28.25 |
| B2O3 | | | | | | 2.19 | 4.43 | 0.71 |
| Li2O | 7.68 | 7.68 | 8.49 | 8.68 | 9.50 | | | |
| Na2O | 18.71 | 15.38 | 16.67 | 17.93 | 16.32 | 15.45 | 14.68 | 16.95 |
| K2O | | 0.80 | | 0.81 | | 11.43 | 9.19 | 8.54 |
| ZnO | 32.15 | 33.07 | 30.54 | 31.55 | 32.96 | 23.04 | 25.68 | 30.94 |
| Nb2O5 | 12.90 | 15.23 | 14.94 | 12.68 | 14.28 | 14.65 | 15.42 | 14.61 |
| TiO2 | | | | | | | | |
| MgO | | | | | | | | |
| CaO | | | | | | 5.00 | | |
| SrO | | | | | | 5.00 | 5.00 | |
| Sb2O3 | | | | | | | | |
| Total | 100.00 | 100.00 | 100.00 | 100.00 | 100.00 | 100.00 | 100.00 | 100.00 |
| Li2O + Na2O + K2O | 26.39 | 23.86 | 25.16 | 27.42 | 25.82 | 26.88 | 23.87 | 25.49 |
| ZnO/R2O | 1.22 | 1.39 | 1.21 | 1.15 | 1.28 | 0.86 | 1.08 | 1.21 |
| Nb2O5 + TiO2 | 12.90 | 15.23 | 14.94 | 12.68 | 14.28 | 14.65 | 15.42 | 14.61 |
| P2O5 + B2O3 | 28.56 | 27.84 | 29.36 | 28.35 | 26.94 | 25.43 | 30.03 | 28.96 |
| nd | 1.70331 | 1.73612 | 1.72239 | 1.70036 | 1.73126 | 1.71007 | 1.71119 | 1.69699 |
| νd | 32.49 | 29.34 | 30.23 | 32.75 | 30.25 | 31.40 | 30.72 | 31.47 |
| Tg(° C.) | 443 | 460 | 457 | 434 | 447 | 478 | 479 | 482 |
| At(° C.) | 490 | 506 | 505 | 481 | 494 | 531 | 529 | 536 |
| α(×10 − 7/° C.) | 124 | 107 | 114 | 129 | 113 | 128 | 117 | 123 |
| TL(° C.) | 810 | 880 | 850 | 810 | 890 | 810 | 870 | 850 |

TABLE 9

| | Practical Example No | | | | | | | |
|---|---|---|---|---|---|---|---|---|
| | 65 | 66 | 67 | 68 | 69 | 70 | 71 | 72 |
| P2O5 | 27.71 | 24.94 | 25.43 | 26.99 | 28.22 | 29.03 | 24.52 | 25.68 |
| B2O3 | 1.15 | 3.62 | 1.89 | 2.78 | 3.26 | 0.66 | 2.98 | 4.57 |
| Li2O | 2.50 | | | | 2.50 | 8.36 | | |
| Na2O | 17.09 | 14.42 | 14.36 | 28.53 | 8.66 | 13.75 | 16.15 | 14.50 |
| K2O | 7.50 | 11.19 | 8.80 | | 10.36 | 0.64 | 10.40 | 9.08 |
| ZnO | 29.38 | 25.15 | 22.59 | 26.66 | 31.26 | 27.48 | 28.40 | 29.90 |
| Nb2O5 | 14.67 | 15.68 | 13.85 | 15.04 | 15.74 | 13.73 | 14.55 | 13.27 |
| TiO2 | | | | | | | | |
| MgO | | | | | | | | |
| CaO | | 5.00 | 6.50 | | | 4.10 | 1.50 | 1.50 |
| SrO | | | 6.58 | | | 2.25 | 1.50 | 1.50 |
| Sb2O3 | | | | | | | | |
| Total | 100.00 | 100.00 | 100.00 | 100.00 | 100.00 | 100.00 | 100.00 | 100.00 |
| Li2O + Na2O + K2O | 27.09 | 25.61 | 23.16 | 28.53 | 21.52 | 22.75 | 26.55 | 23.58 |
| ZnO/R2O | 1.08 | 0.98 | 0.98 | 0.93 | 1.45 | 1.21 | 1.07 | 1.27 |
| Nb2O5 + TiO2 | 14.67 | 15.68 | 13.85 | 15.04 | 15.74 | 13.73 | 14.55 | 13.27 |
| P2O5 + B2O3 | 28.86 | 28.56 | 27.32 | 29.77 | 31.48 | 29.69 | 27.50 | 30.25 |
| nd | 1.70114 | 1.71254 | 1.71378 | 1.69964 | 1.71053 | 1.71518 | 1.70311 | 1.69000 |
| νd | 30.81 | 30.18 | 32.16 | 31.12 | 29.95 | 32.45 | 31.19 | 32.87 |
| Tg(° C.) | 470 | 488 | 480 | 471 | 482 | 457 | 474 | 464 |
| At(° C.) | 520 | 537 | 536 | 520 | 530 | 509 | 523 | 511 |
| α(×10 − 7/° C.) | 127 | 122 | 124 | 130 | 109 | 116 | 128 | 123 |
| TL(° C.) | 860 | 850 | 840 | 830 | 880 | 830 | 870 | 840 |

TABLE 10

| | Practical Example No | | | | | | | |
|---|---|---|---|---|---|---|---|---|
| | 73 | 74 | 75 | 76 | 77 | 78 | 79 | 80 |
| P2O5 | 26.24 | 24.86 | 26.31 | 23.32 | 28.19 | 25.60 | 28.99 | 28.07 |
| B2O3 | 4.48 | 3.14 | 4.26 | 3.18 | 0.84 | 3.94 | 0.29 | 0.33 |
| Li2O | | | | | | | | |
| Na2O | 16.57 | 16.02 | 13.98 | 16.20 | 20.15 | 14.90 | 15.97 | 17.56 |
| K2O | 9.00 | 9.00 | 9.36 | 11.11 | 6.67 | 9.42 | 11.66 | 9.96 |
| ZnO | 28.90 | 29.90 | 26.97 | 29.85 | 22.05 | 27.68 | 22.82 | 22.36 |
| Nb2O5 | 13.53 | 14.08 | 16.12 | 13.34 | 17.10 | 15.46 | 16.93 | 16.71 |
| TiO2 | | | | | | | | |
| MgO | | | | | | | | 1.30 |
| CaO | 1.50 | 1.50 | 1.50 | 1.50 | 2.50 | 1.50 | 0.84 | 1.20 |
| SrO | 1.50 | 1.50 | 1.50 | 1.50 | 2.50 | 1.50 | 2.50 | 2.50 |
| Sb2O3 | | | | | | | | 0.01 |
| Total | 101.72 | 100.00 | 100.00 | 100.00 | 100.00 | 100.00 | 100.00 | 100.00 |
| Li2O + Na2O + K2O | 25.57 | 25.02 | 23.34 | 27.31 | 26.82 | 24.32 | 27.63 | 27.52 |
| ZnO/R2O | 1.13 | 1.20 | 1.16 | 1.09 | 0.82 | 1.14 | 0.83 | 0.81 |
| Nb2O5 + TiO2 | 13.53 | 14.08 | 16.12 | 13.34 | 17.10 | 15.46 | 16.93 | 16.71 |
| P2O5 + B2O3 | 30.72 | 28.00 | 30.57 | 26.50 | 29.03 | 29.54 | 29.28 | 28.40 |
| nd | 1.69613 | 1.70363 | 1.71650 | 1.69805 | 1.71256 | 1.71260 | 1.70302 | 1.70589 |
| νd | 32.26 | 31.56 | 29.62 | 32.25 | 29.85 | 30.21 | 31.27 | 30.37 |
| Tg(° C.) | 471 | 472 | 496 | 470 | 494 | 489 | 491 | 491 |
| At(° C.) | 519 | 519 | 543 | 517 | 546 | 538 | 543 | 542 |
| α(×10 − 7/° C.) | 128 | 123 | 112 | 126 | 123 | 115 | 129 | 128 |
| TL(° C.) | 810 | 860 | 870 | 840 | 870 | 860 | 860 | 870 |

TABLE 11

| | Practical Example No | | | | | | | |
|---|---|---|---|---|---|---|---|---|
| | 81 | 82 | 83 | 84 | 85 | 86 | 87 | 88 |
| P2O5 | 22.24 | 26.94 | 26.96 | 25.20 | 26.90 | 27.60 | 28.30 | 37.70 |
| B2O3 | 7.60 | 1.06 | 1.04 | 4.50 | | | 0.51 | |
| Li2O | | 7.68 | | | 8.68 | 15.00 | | 7.68 |
| Na2O | 17.85 | 17.36 | 17.85 | 14.55 | 15.03 | 14.10 | 5.74 | 9.16 |
| K2O | 9.00 | 3.41 | 8.57 | 9.17 | 3.47 | | 20.10 | 1.56 |
| ZnO | 24.76 | 29.07 | 24.90 | 29.08 | 30.12 | 28.20 | 29.80 | 21.46 |
| Nb2O5 | 15.55 | 14.48 | 15.68 | 14.67 | 15.80 | 15.10 | 15.55 | 22.44 |
| TiO2 | | | | | | | | |
| MgO | | | | | | | | |
| CaO | 1.50 | | | 2.50 | 1.00 | | | |
| SrO | 1.50 | | 2.50 | 1.83 | | | | |
| Sb2O3 | | | | | | | | |
| Total | 100.00 | 100.00 | 100.00 | 100.00 | 100.00 | 100.00 | 100.00 | 100.00 |
| Li2O + Na2O + K2O | 26.85 | 28.45 | 26.42 | 23.72 | 27.18 | 29.10 | 25.84 | 18.40 |
| ZnO/R2O | 0.92 | 1.02 | 0.94 | 1.23 | 1.11 | 0.97 | 1.15 | 1.17 |
| Nb2O5 + TiO2 | 15.55 | 14.48 | 15.68 | 14.67 | 15.80 | 15.10 | 15.55 | 22.44 |
| P2O5 + B2O3 | 29.84 | 28.00 | 28.00 | 29.70 | 26.90 | 27.60 | 28.81 | 37.70 |
| nd | 1.71515 | 1.71557 | 1.70796 | 1.70628 | 1.73041 | 1.73549 | 1.68706 | 1.71963 |
| νd | 30.04 | 30.84 | 31.02 | 31.01 | 29.51 | 29.65 | 30.83 | 29.64 |
| Tg(° C.) | 473 | 442 | 484 | 485 | 452 | 436 | 490 | 494 |
| At(° C.) | 522 | 489 | 535 | 533 | 500 | 484 | 543 | 544 |
| α(×10 − 7/° C.) | 127 | 128 | 124 | 117 | 118 | 121 | 127 | 107 |
| TL(° C.) | 890 | 860 | 850 | 870 | 890 | 880 | 890 | 890 |

TABLE 12

| | Practical Example No | | | | | | | |
|---|---|---|---|---|---|---|---|---|
| | 89 | 90 | 91 | 92 | 93 | 94 | 95 | 96 |
| P2O5 | 25.57 | 28.72 | 29.57 | 29.79 | 26.03 | 25.10 | 25.17 | 23.03 |
| B2O3 | 5.36 | 0.49 | 0.38 | 0.11 | 0.77 | 0.83 | 2.83 | |
| Li2O | | 7.44 | 6.89 | 7.97 | 1.38 | | | 7.68 |
| Na2O | 12.09 | 15.49 | 15.05 | 14.38 | 13.84 | 16.60 | 12.99 | 17.40 |
| K2O | 9.98 | 1.37 | 0.79 | 0.64 | 11.08 | 7.93 | 8.80 | 0.80 |
| ZnO | 21.90 | 24.67 | 25.22 | 24.99 | 26.91 | 24.07 | 22.03 | 36.00 |
| Nb2O5 | 15.10 | 14.06 | 14.08 | 14.07 | 15.26 | 15.00 | 11.03 | 11.34 |
| TiO2 | | | | | | | 3.73 | 3.75 |
| MgO | | | | | | | | |

TABLE 12-continued

| | Practical Example No | | | | | | | |
|---|---|---|---|---|---|---|---|---|
| | 89 | 90 | 91 | 92 | 93 | 94 | 95 | 96 |
| CaO | 5.00 | 4.10 | 4.10 | 4.10 | 1.50 | 3.80 | 0.63 | |
| SrO | 5.00 | 2.82 | 2.85 | 2.84 | 1.78 | 6.20 | 12.79 | |
| $Al_2O_3$ | | | | | 1.18 | 0.47 | | |
| $La_2O_3$ | | | | 0.34 | | | | |
| $Gd_2O_3$ | | | 0.51 | | | | | |
| $Y_2O_3$ | | | | 0.21 | | | | |
| $Ta_2O_5$ | | 0.83 | 0.56 | 0.56 | 0.27 | | | |
| $Sb_2O_3$ | | | | | | | | |
| $SnO_2$ | | 0.01 | | | | | | |
| Total | 100.00 | 100.00 | 100.00 | 100.00 | 100.00 | 100.00 | 100.00 | 100.00 |
| $Li_2O + Na_2O + K_2O$ | 22.07 | 24.30 | 22.73 | 22.99 | 26.30 | 24.53 | 21.79 | 25.88 |
| $ZnO/R_2O$ | 0.99 | 1.02 | 1.11 | 1.09 | 1.02 | 0.98 | 1.01 | 1.39 |
| $Nb_2O_5 + TiO_2$ | 15.10 | 14.06 | 14.08 | 14.07 | 15.26 | 15.00 | 14.76 | 15.09 |
| $P_2O_5 + B_2O_3$ | 30.93 | 29.21 | 29.95 | 29.90 | 26.80 | 25.93 | 28.00 | 23.03 |
| nd | 1.70887 | 1.72250 | 1.72241 | 1.72338 | 1.71545 | 1.71569 | 1.70020 | 1.74627 |
| νd | 31.65 | 31.30 | 31.61 | 31.66 | 29.83 | 30.94 | 32.94 | 29.03 |
| Tg(° C.) | 482 | 472 | 481 | 475 | 483 | 484 | 483 | 445 |
| At(° C.) | 532 | 524 | 533 | 527 | 537 | 538 | 538 | 491 |
| α(×10−7/° C.) | 115 | 115 | 111 | 113 | 118 | 120 | 121 | 111 |
| TL(° C.) | 890 | 870 | 880 | 870 | 890 | 880 | 770 | 890 |

TABLE 13

| | Practical Example No | | | | | | |
|---|---|---|---|---|---|---|---|
| | 97 | 98 | 99 | 100 | 101 | 102 | 103 |
| $P_2O_5$ | 28.00 | 28.00 | 29.04 | 27.38 | 35.00 | 28.00 | 27.93 |
| $B_2O_3$ | | | | 0.19 | | | |
| $Li_2O$ | 8.21 | 8.68 | 6.88 | 22.07 | 9.49 | 7.68 | 8.68 |
| $Na_2O$ | 16.00 | 15.51 | 16.80 | | 8.51 | 11.18 | 9.79 |
| $K_2O$ | 0.79 | 0.81 | | 2.93 | | 0.80 | |
| ZnO | 21.82 | 31.90 | 32.66 | 26.39 | 31.90 | 37.24 | 36.00 |
| $Nb_2O_5$ | 8.61 | 10.00 | 9.83 | 10.85 | 10.00 | 10.00 | 10.00 |
| $TiO_2$ | 16.57 | 5.10 | 4.79 | 9.76 | 5.10 | 5.10 | 5.10 |
| MgO | | | | | | | |
| CaO | | | | | | | |
| SrO | | | | | 0.43 | | 2.50 |
| Total | 100.00 | 100.00 | 100.00 | 100.00 | 100.00 | 100.00 | 100.00 |
| $Li_2O + Na_2O + K_2O$ | 25.00 | 25.00 | 23.68 | 25.00 | 18.00 | 19.66 | 18.47 |
| $ZnO/R_2O$ | 0.87 | 1.28 | 1.38 | 1.06 | 1.77 | 1.89 | 1.95 |
| $Nb_2O_5 + TiO_2$ | 25.18 | 15.10 | 14.62 | 20.61 | 15.10 | 15.10 | 15.10 |
| $P_2O_5 + B_2O_3$ | 28.00 | 28.00 | 29.04 | 27.57 | 35.00 | 28.00 | 27.93 |
| nd | 1.75891 | 1.71196 | 1.70399 | 1.76443 | 1.69448 | 1.72738 | 1.73283 |
| νd | 26.66 | 31.10 | 31.77 | 26.44 | 31.96 | 30.34 | 30.36 |
| Tg(° C.) | 496 | 448 | 458 | 498 | 465 | 461 | 464 |
| At(° C.) | 546 | 496 | 505 | 547 | 513 | 512 | 511 |
| α(×10−7/° C.) | 101 | 118 | 117 | 95 | 103 | 98 | 93 |
| TL(° C.) | 890 | 810 | 786 | 890 | 750 | 890 | 880 |

TABLE 14

| | Comparative Example No (mol %) | | |
|---|---|---|---|
| | 1 | 2 | 3 |
| $P_2O_5$ | 24.05 | 26.26 | 29.64 |
| $B_2O_3$ | | 4.99 | 5.90 |
| $SiO_2$ | | | 0.54 |
| $Al_2O_3$ | | 2.20 | 1.06 |
| $Li_2O$ | | 11.24 | 10.86 |
| $Na_2O$ | 5.51 | 14.27 | 26.87 |
| $K_2O$ | 12.08 | 7.73 | 0.57 |
| ZnO | 48.94 | 19.95 | 5.71 |
| $Nb_2O_5$ | 9.42 | 8.76 | 10.66 |
| $TiO_2$ | | | 7.44 |
| $WO_3$ | | 3.62 | |
| MgO | | | |
| CaO | | | |
| SrO | | | |
| BaO | | 0.95 | 0.71 |
| $Sb_2O_3$ | | 0.04 | 0.04 |
| Total | 100.00 | 100.01 | 100.00 |
| $Li_2O + Na_2O + K_2O$ | 17.59 | 33.24 | 38.30 |
| $ZnO/R_2O$ | 2.78 | 0.60 | 0.15 |
| $Nb_2O_5 + TiO_2$ | 9.42 | 8.76 | 18.10 |
| $P_2O_5 + B_2O_3$ | 24.05 | 31.25 | 35.54 |

TABLE 14-continued

| | Comparative Example No (mol %) | | |
|---|---|---|---|
| | 1 | 2 | 3 |
| nd | 1.6855 | 1.6731 | 1.6807 |
| vd | 34.7 | 35.2 | 32 |
| Tg (° C.) | 476 | 413 | 460 |
| At (° C.) | 519 | 449 | 500 |
| α (×10−7/° C.) | 109 | 145 | 143 |
| TL (° C.) | 980 or above | 780 | 830 |

The invention claimed is:

1. An optical glass comprising, by mole:
18% to 38% of $P_2O_5$;
0% to 15% of $B_2O_3$,
where $P_2O_5+B_2O_3$ equals 23% to 40%;
4% to 28% of $Nb_2O_5$;
0% to 20% of $TiO_2$,
where $Nb_2O_5+TiO_2$ equals 10% to 30%;
15% to 35% of $Li_2O+Na_2O+K_2O$; and
30.51% to 37.24% of ZnO,
wherein
$ZrO_2$, $As_2O_3$, an F ingredient, PbO, $TeO_2$, $Tl_2O$, CdO, $GeO_2$, $Al_2O_3$, $La_2O_3$, $Gd_2O_3$, $Y_2O_3$, $Ta_2O_5$, BaO, $WO_3$, $Bi_2O_3$, and $SiO_2$ are not contained,
a ratio $ZnO/(Li_2O+Na_2O+K_2O)$ of a mol % of ZnO to a total mol % of $Li_2O+Na_2O+K_2O$ is 0.8 to 2.0 and
the optical glass has optical constants with a refractive index (nd) for a d-line in a range of 1.68 to 1.78 and an Abbe number (vd) in a range of 26 to 35.

2. The optical glass according to claim 1, wherein, by mole, $Li_2O$ is in a content of 0% to 32%,
$Na_2O$ is in a content of 0% to 32%,
$K_2O$ is in a content of 0% to 30%, and
the optical glass further comprises, by mole:
0% to 15% of MgO;
0% to 15% of CaO;
0% to 15% of SrO;
0% to 0.5% of $Sb_2O_3$; and
0% to 0.5% of $SnO_2$.

3. The optical glass according to claim 1, wherein the optical glass has a glass transition temperature (Tg) of 500° C. or lower.

4. The optical glass according to claim 1, wherein the optical glass has a linear expansion coefficient (α) at 100° C. to 300° C. of not more than 130×10⁻⁷/° C.

5. The optical glass according to claim 1, wherein the optical glass has a liquidus temperature (TL) of 900° C. or lower.

6. An optical element comprising the optical glass according to claim 1.

7. An optical element formed by molding the optical glass according to claim 1 by liquid-drop molding based on a direct precision press method.

* * * * *